United States Patent [19]

Mizukawa et al.

[11] 4,317,975
[45] Mar. 2, 1982

[54] INDUCTION HEATING APPARATUS WITH MEANS FOR DETECTING ZERO CROSSING POINT OF HIGH-FREQUENCY OSCILLATION TO DETERMINE TRIGGERING TIME

[75] Inventors: Takumi Mizukawa; Keizo Amagami; Mitsuyuki Kiuchi; Hirokazu Yoshida; Tatsuo Saka, all of Kadoma, Japan

[73] Assignee: Matsushita Electric Industrial Co., Ltd., Japan

[21] Appl. No.: 972,881

[22] Filed: Dec. 26, 1978

Related U.S. Application Data

[62] Division of Ser. No. 749,258, Dec. 10, 1976, Pat. No. 4,145,592.

[30] Foreign Application Priority Data

Jan. 14, 1976 [JP] Japan ................................. 51-3500

[51] Int. Cl.³ .......................... H05B 6/08; H05B 6/12
[52] U.S. Cl. .......................... 219/10.49 R; 219/10.77; 323/235; 323/241; 363/78; 363/160
[58] Field of Search ............... 219/10.77, 10.49, 10.75; 363/160, 161, 162, 165, 10, 78, 159; 323/18, 235, 236, 237, 241, 246; 307/252 UA, 265, 269, 40

[56] References Cited

U.S. PATENT DOCUMENTS

| | | | |
|---|---|---|---|
| 3,436,642 | 4/1969 | Segsworth | 219/10.75 |
| 3,564,394 | 2/1971 | Opal et al. | 323/235 X |
| 3,686,558 | 8/1972 | Havas et al. | 219/10.77 |
| 3,921,092 | 11/1975 | Schatz | 219/10.77 |
| 3,978,307 | 8/1976 | Amagami et al. | 219/10.77 |
| 4,063,146 | 12/1977 | Oliver | 323/241 |
| 4,074,101 | 2/1978 | Kiuchi et al. | 219/10.49 R |

Primary Examiner—B. A. Reynolds
Assistant Examiner—Philip H. Leung
Attorney, Agent, or Firm—Robert E. Burns; Emmanuel J. Lobato; Bruce L. Adams

[57] ABSTRACT

Induction heating apparatus using gate-controlled switching devices includes a zero crossing point detector for detecting the occurrence of each zero crossing point of high frequency energization current, and a timing circuit which provides timing action in response to the detected zero crossing point. The timing action is controlled by a power control circuit which detects the level of energy delivered to a load within a range from the inherent turn-off time of the gate-controlled switching devices to a desired value.

5 Claims, 16 Drawing Figures

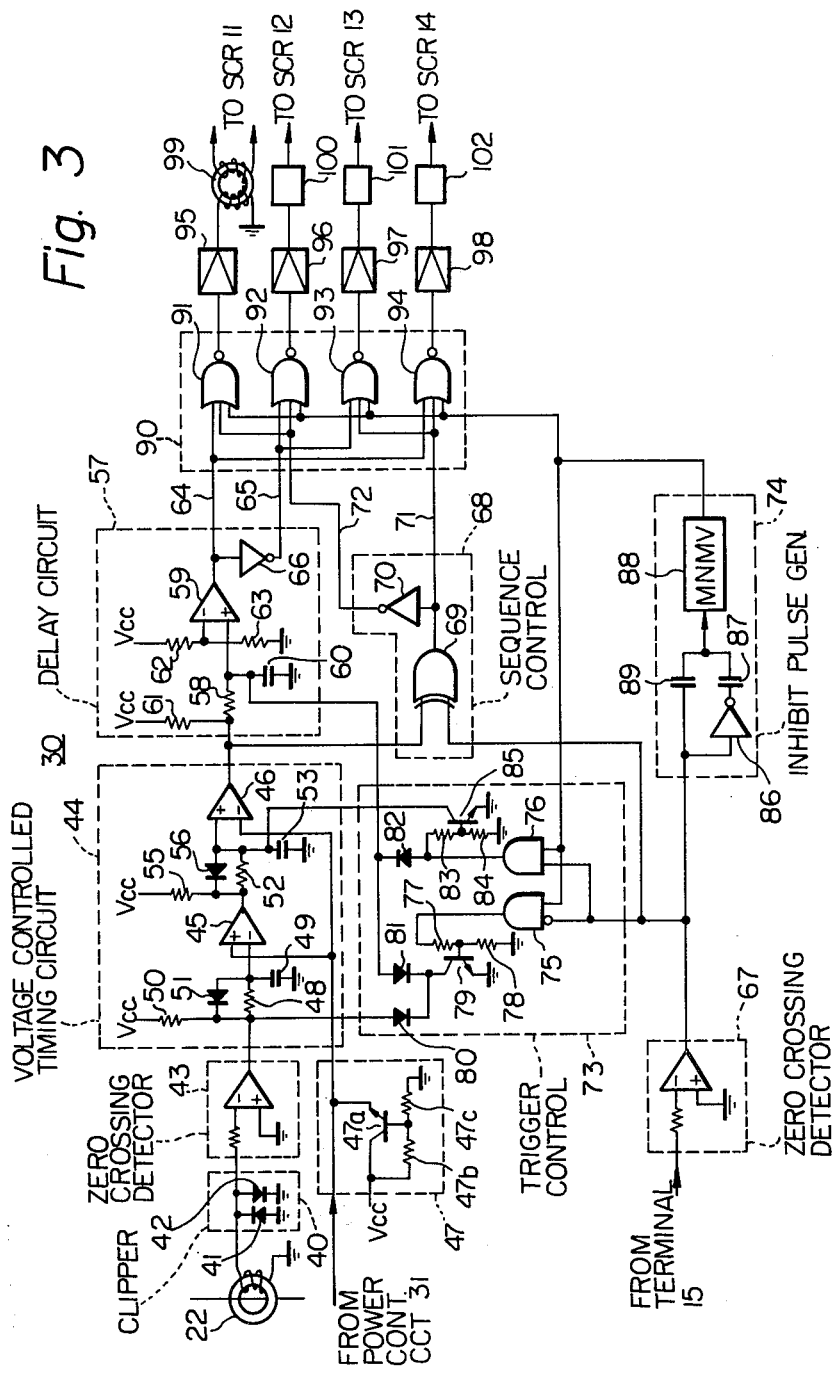

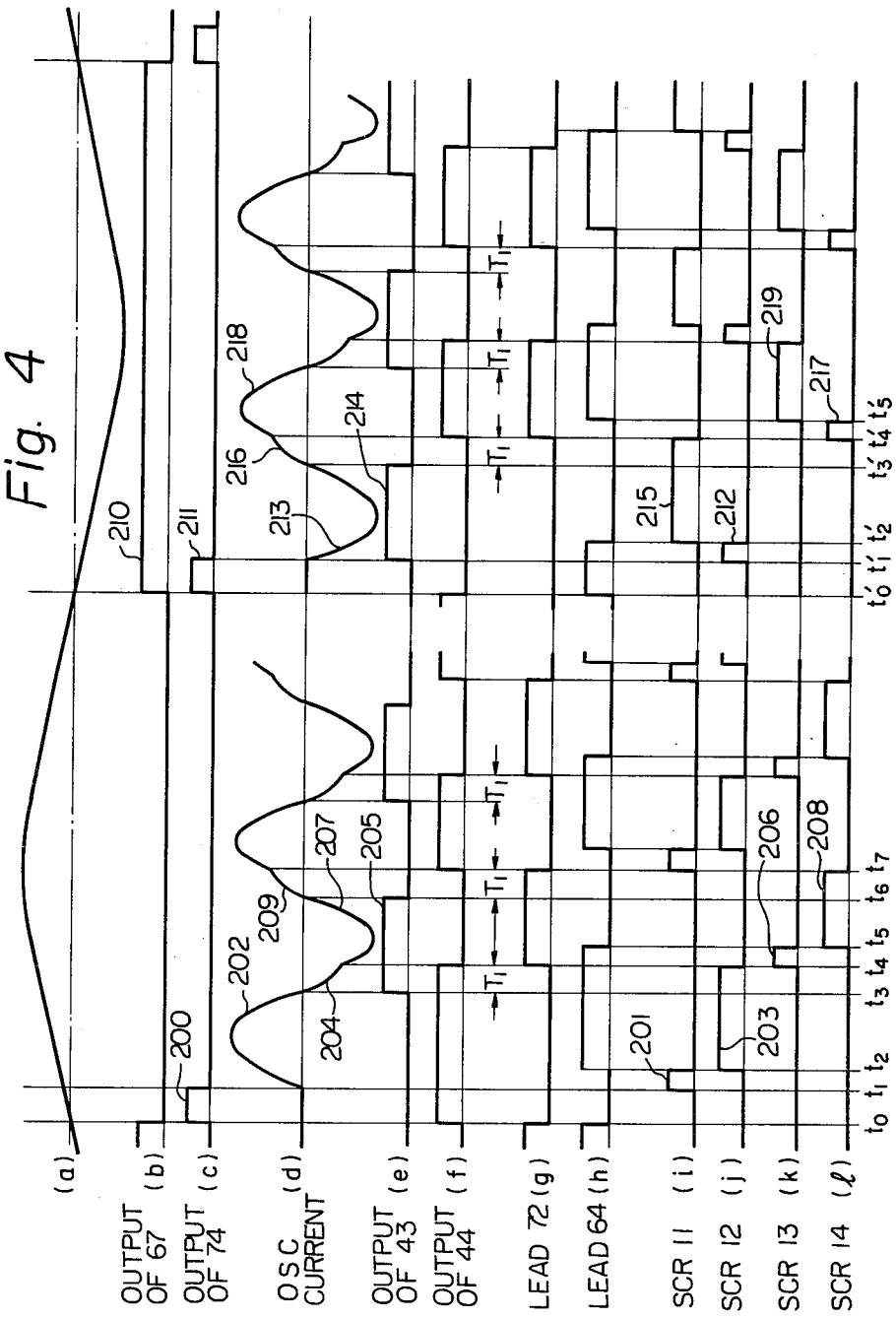

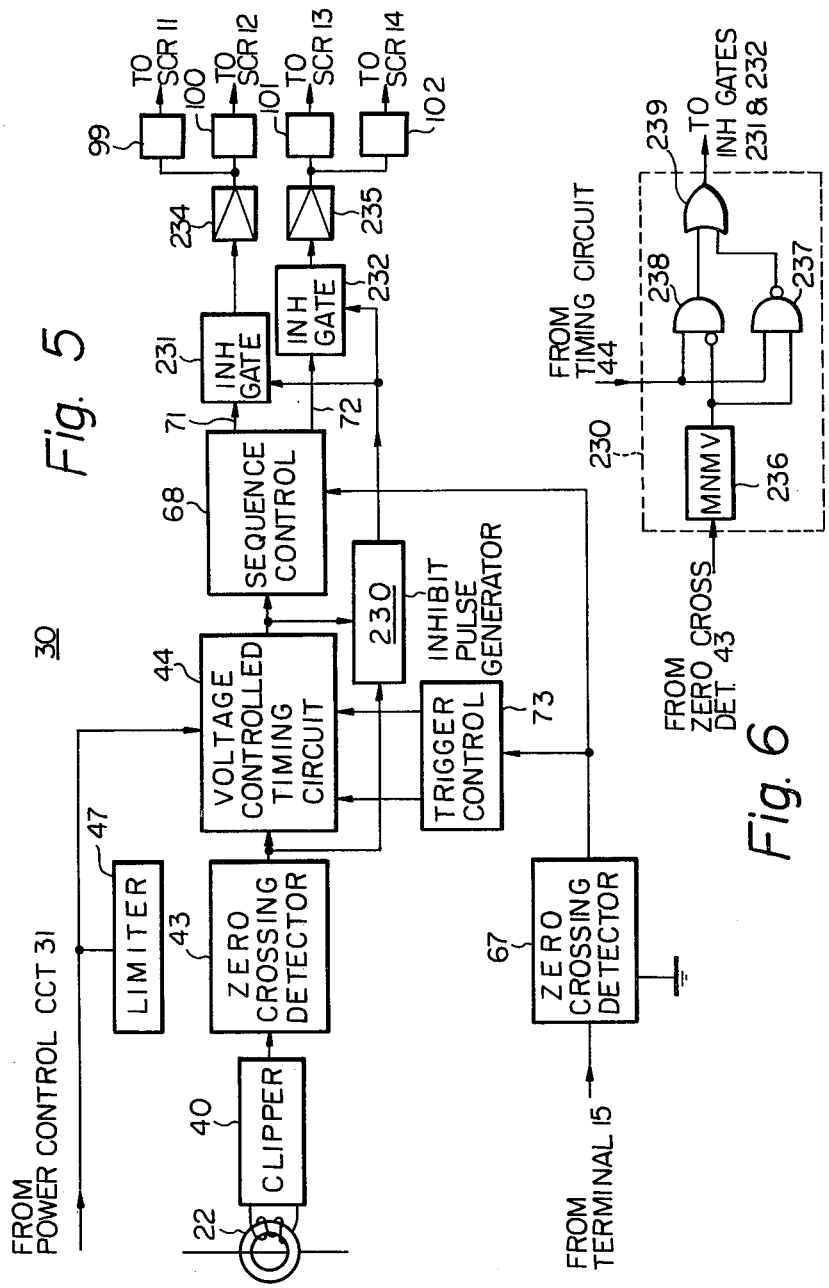

INDUCTION HEATING APPARATUS WITH MEANS FOR DETECTING ZERO CROSSING POINT OF HIGH-FREQUENCY OSCILLATION TO DETERMINE TRIGGERING TIME

This is a divisional of application Ser. No. 749,258, filed Dec. 10, 1976, U.S. Pat. No. 4,145,592.

BACKGROUND OF THE INVENTION

The present invention relates generally to induction heating, and in particular to apparatus for induction heating in which the zero crossing point of high-frequency energization current is detected for controlling the firing angle of gate-controlled switching devices.

The induction heating apparatus usually comprises a gate-controlled switching circuit connected to a source of low frequency alternating current potential, a gating circuit for triggering the switching circuit into conduction, and a commutation circuit including an induction heating coil to provide commutation of current through the conducting switching circuit. The commutation circuit is tuned to a frequency in the inaudible or ultrasonic range, and the pulse repetition rate is usually in the neighborhood of the resonant frequency of the commutation circuit. The current triggered in the commutation circuit is therefore in the inaudible frequency range which is suitable for induction heating purposes.

It is known in the art to control the power level of the apparatus by varying the frequency of the energization current. This frequency control is usually effected by varying the interval between successive trigger pulses in response to the user's setting level.

However, the resonant frequency of the commutation circuit depends largely on the magnitude of inductive coupling between the heating coil and a magnetic work load placed thereover. If the magnitude of inductive coupling widely varies due to a sudden change of loads, there is a likelihood of the occurrence of commutation failure, since the gate-controlled switching circuit fails to turn off prior to the time of occurrence of a subsequent trigger pulse.

SUMMARY OF THE INVENTION

The primary object of the present invention is therefore to provide an improved induction heating apparatus which is free from commutation failure due to a sudden change of loads.

Another object of the present invention is to provide an induction heating apparatus which includes a zero crossing detector for sensing the occurrence of a zero crossing point of the high frequency energization current and a voltage-controlled timing circuit which times in response to the detection of a zero crossing point of the oscillation to apply a subsequent trigger pulse to the switching circuit.

A further object of the invention is to provide an induction heating apparatus in which the energy withdrawn by the load is detected and compared with a user's setting power level to control the voltage-controlled timing circuit in order to control the time interval between the zero crossing point of the oscillation and the subsequent triggering time such that the time interval ranges from the minimum turn-off time of the switching circuit to any desired value.

A still further object of the invention is to provide an induction heating which includes at least two bidirectional switching devices and a novel gating circuit which uses the output from the zero crossing detector as a feedback signal to control the firing angle of the switching devices such that there is no interruption of the high frequency energization current between successive triggering times, to thereby minimize the objectionable radio frequency interference.

In accordance with the present invention, there is provided apparatus for induction heating which comprises at least two gate-triggered bidirectional switching devices connected in series circuit relationship to a source of low frequency alternating current potential, a commutation circuit including an induction heating coil connected to the bidirectional switching devices, a zero crossing detector for detecting a zero crossing point of high frequency oscillation in the commutation circuit, and means for alternately triggering one of the bidirectional switching devices into conduction after a time interval from the sensed zero crossing point to generate said high frequency oscillation through the triggered switching device and the commutation circuit.

Specifically, the triggering means includes a voltage-controlled timing circuit which comprises first and second operational amplifier comparators, and first and second identical RC timing networks. The first RC network is connected between the output from the zero crossing detector and the inverting input of the first comparator and the second RC network is connected between the output of the first comparator and the noninverting input of the second comparator. The noninverting input of the first comparator and the inverting input of the second comparator are connected together to a power control circuit which detects the magnitude of the power delivered to the load. The capacitors of the first and second timing networks are charged and discharged in turn to provide delayed application of a trigger pulse to the switching devices when the charges stored in the capacitors reach the threshold level of the comparators.

Alternatively, the timing action is provided by a digital circuit including a programmable counter and an analog-to-digital converter. The latter converts the signal from the power control circuit into a digital value. The zero crossing detector enables the programmable counter to cause it to count clock pulses and upon the count reaching the digital value the counter generates an output which persists as long as the time duration of the output from the zero crossing detector.

BRIEF DESCRIPTION OF THE DRAWINGS

The invention will be further described with reference to the accompanying drawings, in which:

FIG. 3 is an embodiment of a gating control circuit of FIG. 1;

FIG. 4 is a series of waveform appearing at various points of the circuit of FIG. 3;

FIG. 5 is a first modification of the gating control circuit of FIG. 3;

FIG. 6 is a circuit diagram of an inhibit pulse generator of FIG. 5;

DESCRIPTION OF THE PREFERRED EMBODIMENTS

Figure 1:
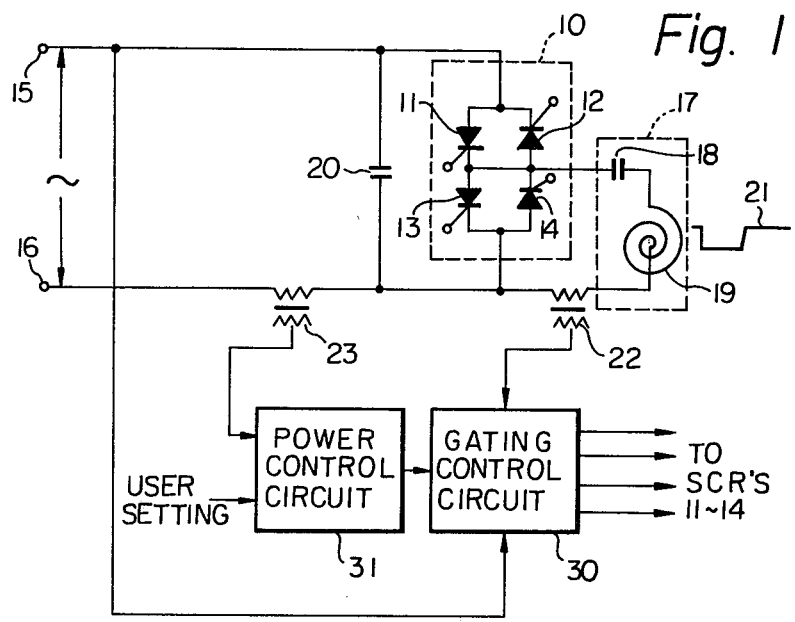
FIG. 1 is a general circuit diagram of the induction heating apparatus embodying the present invention.

Referring now to FIG. 1 of the drawings, in which the induction heating cooking apparatus embodying the present invention is illustrated partly in schematic circuit blocks. The apparatus comprises a cycloconverter 10 including a first pair of gate-controlled rectifiers or thyristors 11 and 12 connected in parallel with their polarities opposed to each other to form a first bidirectional switching device and a second pair of thyristors 13 and 14 are connected in parallel with their polarities opposed to each other to form a second bidirectional switching device. The first and second bidirectional switching devices are series-connected to input power terminals 15 and 16 which are, in use, connected to a standard alternating current source (not shown). The thyristors 11 to 14 each receive a respective one of trigger pulses from a gating control circuit 30 on their gate control terminals. A commutation circuit 17 comprised by a series-connected capacitor 18 and an induction work coil 19 is connected across the thyristors 13 and 14 to allow current to be oscillated through the conducting thyristor and through a capacitor 20 connected across the terminals 15 and 16. A magnetic cooking ware 21 is, in use, placed over the work coil 19 to be inductively heated by the time-varying magnetic field generated by the oscillating current flow through the work coil 19.

A current transformer 22 is interposed in the circuit between the work coil 19 and the second bidirectional switching device 13, 14 to detect the oscillating current which in turn is applied to the gating control circuit 30 to detect the zero crossing point of the oscillating current as described later. A second current transformer 23 is interposed in the circuit between the input terminal 16 and the capacitor 20 to detect the current that represents the magnitude of inductive coupling between the work coil 19 and the magnetic cooking utensil 21. The signal representing the inductive coupling is applied to a power control circuit 31.

Figure 2:
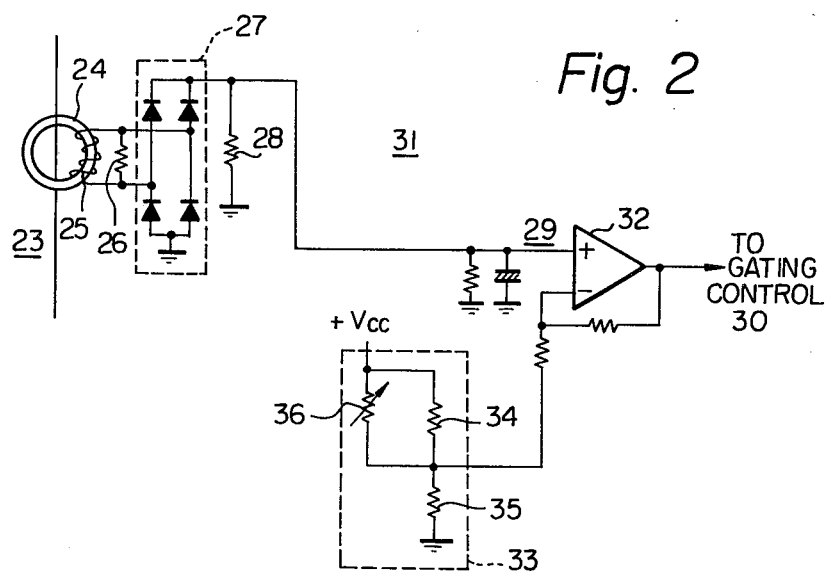
FIG. 2 is a circuit diagram of a power control circuit of FIG. 1.

FIG. 2 illustrates the power control circuit 31 in detail. The current transformer 23 is shown comprised by a ring core 24 through which the circuit leg between the terminal 16 and one electrode of the capacitor 20 extends to serve as a primary of the transformer. The core 24 carries a secondary winding 25 to which a resistor 26 is coupled to develop a voltage thereacross, which voltage is rectified by a rectifier circuit 27 formed by four diodes into a DC voltage which appears across a resistor 28. The inductive coupling representative DC voltage is filtered through a filtering RC network 29 and coupled to the noninverting input of an operational amplifier comparator 32 for comparison with a potential at the inverting input thereof applied from a power setting circuit 33 formed by a pair of series-connected resistors 34 and 35 and a variable resistor 36 connected across the resistor 34, the resistors 34 and 35 being coupled between a DC voltage source Vcc and ground to develop a user's setting voltage at the junction between resistors 34 and 35. When the potential at the noninverting terminal is above the user's setting voltage, the comparator 32 produces a positive signal at the output thereof and when the situation is reversed a negative signal will appear at the output.

FIG. 3 illustrates a first embodiment of the gating control circuit 30. The current transformer 22 is formed by a similar core arrangement to that shown in FIG. 2 and coupled to a clipping circuit 40 comprised by a pair of inversely parallel connected diodes 41 and 42. During each half cycle of the oscillating current detected by the current transformer 22, each diode is made conducting to develop thereacross a constant potential of approximately 0.7 volts. Therefore, the voltage at the output of clipping circuit 40 jumps to the 0.7-volt positive or negative potential level from the zero voltage level each time the oscillating current reverses its polarity. The output from the clipper is coupled to the inverting input of an operational amplifier comparator or zero crossing detector 43 for comparison with the ground or zero-volt potential applied to the noninverting input thereof. The output of the comparator 43 goes low when the oscillating current flows through thyristor 11 or 13 and goes high when the direction of the current flow is reversed. The output from the zero crossing detector 43 is applied to a voltage-controlled timing circuit 44 which comprises a first operational amplifier comparator 45 and a second operational amplifier comparator 46.

The noninverting input of operational amplifier 45 and the inverting input of operational amplifier 46 are connected together to the output of the power control circuit 31 through a voltage limiter 47 which sets a minimum voltage level that corresponds to the minimum turn-off time of the thyristors used. The output of the zero crossing detector 43 is coupled through a resistor 48 to the inverting input of operational amplifier 45 and through a capacitor 49 to ground, and further through a resistor 50 to a DC voltage supply Vcc. Resistors 48, 50 and capacitor 49 constitute an RC time constant circuit that sets the potential for the inverting input of operational amplifier 45. The capacitor 49 will be charged through resistors 50 and 48 by the current supplied from the DC voltage supply Vcc when the zero crossing detector 43 is driven to the high output state. A diode 51 is connected across the resistor 48 to provide a discharging circuit for the capacitor 49. The output of the operational amplifier 45 is connected through a resistor 52 to the noninverting input of operational amplifier 46 and through a capacitor 53 to ground, and further through a resistor 55 to the DC voltage supply Vcc. The resistors 52 and 55 have respectively equal resistance values to the resistance values of 48 and 50, and capacitor 53 has equal capacitance value to that of capacitor 49. Resistors 52, 55 and capacitor 53 constitute a second RC time constant circuit that sets the potential at the noninverting input of operational amplifier 46. Capacitor 53 will be charged through resistors 55 and 52 when the operational amplifier 45 is driven to the high output state. A diode 56 is connected across the resistor 52 to provide a discharging circuit for the capacitor 53.

As will be described later, the voltage-controlled timing circuit 44 provides timing action upon each reversal of the oscillating current polarity determined by zero crossing detector 43, and the power control circuit 31 controls the timing threshold of the timing circuit 44 to control the firing angle of the thyristors to be subsequently fired after oscillation has once been triggered at the beginning of each half cycle of the source voltage in order to sustain the oscillation as long as the source voltage retains its polarity.

The output from the voltage-controlled timing circuit 44 is coupled to a delay circuit 57 which delays the input signal by a predetermined period to generate trigger pulses and also determines to which one of thyristors 11 and 12 the initial trigger pulse is to be applied at the beginning of each half cycle of the source voltage. The output of the circuit 44 is connected through a resistor 58 to the noninverting input of an operational amplifier 59 and through a capacitor 60 to ground, and further through a resistor 61 to the DC voltage supply Vcc. Resistors 58, 61 and capacitor 60 constitute an RC time constant circuit to charge capacitor 60 through resistor 61 when the voltage-controlled timing circuit 44 is at the high output level, in order to set the potential for the noninverting input of operational amplifier 59 for comparison with a reference DC voltage set by the junction between resistors 62 and 63 series-connected between the DC voltage supply Vcc and ground. The output of operational amplifier 59 is connected to a true output lead 64 and through a NOT circuit 66 to the complementary output lead 65.

In the embodiment of FIG. 3, when the potential at the input terminal 15 is positive with respect to terminal 16, the oscillating current is triggered by an initial trigger pulse applied to the thyristor 11 in preference to the other thyristors after the source voltage has risen to a sufficient level to cause the thyristor 11 to turn on. Once the thyristor 11 is fired, thyristors 12, 13 and 14 will be fired in succession in the order named. When the source voltage reverses its polarity, oscillation will be triggered by firing the thyristor 12 in preference to the other thyristors, and thereafter thyristors 11, 14 and 13 are fired in succession in the order which is reverse to the firing sequence of the previous half cycle of the source voltage.

In order to achieve the delayed triggering of thyristors 11 and 12 at the beginning of each source voltage half cycle and the triggering sequence control of thyristors 11 to 14 in the subsequent period, a second zero crossing detector 67 is provided which comprises an operational amplifier having its inverting input connected to the input terminal 15 and its noninverting input connected to ground or zero volt potential. The output from the zero crossing detector 67 is coupled to a first input of a sequence control circuit 68 which comprises an Exclusive-OR gate 69 and a NOT circuit 70. The second input of the Exclusive-OR gate is connected to the output of voltage-controlled timing circuit 44. The sequence control circuit 68 generates a true and a complementary output on its corresponding leads 71 and 72, respectively. Since the Exclusive-OR gate generates a high-level output only when either of the input signals is at the "1" logic state, the output waveform of the Exclusive-OR gate 69 is inverse of that of the zero crossing detector 67 during the positive half cycle of the potential at the input terminal 15, and exactly the same as that of the latter when the source voltage reverses its polarity.

The output from the zero crossing detector 67 is further connected to a trigger control circuit 73 and to an inhibit pulse generator 74. The trigger control circuit 73 comprises AND gates 75 and 76 having one of their inputs connected together to the output of the inhibit pulse generator 74. AND gate 75 has an inverted input connected to the second input of AND gate 76 and to the output of zero crossing detector 67. The output of AND gate 75 is coupled through a voltage divider formed by series-connected resistors 77 and 78. The junction between the resistors 77 and 78 is connected to the base of a transistor 79 which, when conductive, couples the capacitor 49 of voltage-controlled timing circuit 44 through diodes 51 and 80 to ground and the capacitor 60 of delay circuit 57 through diode 81 to ground to instantaneously discharge the energy stored in capacitors 49 and 60 at the same time. The output of AND gate 76 is connected through a diode 82 to the capacitor 60 of the delay circuit 57 and to a voltage divider formed by series-connected resistors 83 and 84. The junction between resistors 83 and 84 is connected to the base of a transistor 85. The capacitor 53 of the timing circuit 44 is connected through the collector-emitter path of transistor 85 to ground. The AND gate 76, when activated, charges capacitor 60 through diode 82, while at the same time drives the transistor 85 into conduction to discharge capacitor 53.

The inhibit pulse generator 74 includes a NOT circuit 86, a capacitor 87 and a monostable multivibrator 88 all of which are connected in series between the input and output terminals thereof, and a capacitor 89 connected in parallel with the NOT circuit 86 and capacitor 87. At the beginning of each half cycle of the source voltage, the output of zero crossing detector 67 jumps to the high or low output level depending upon the polarity of the source voltage and alternately charges the capacitors 87 and 89. In response to the charged voltage the monostable multivibrator 88 produces a pulse of a predetermined duration which allows the source voltage to reach a level sufficient to cause firing. The inhibit pulse is further applied to a gate circuit 90 which comprises a set of four NOR gates 91, 92, 93 and 94. First inputs of NOR gates 91 and 94 are connected together to the true output 64 of the trigger control 57 and first inputs of NOR gates 92 and 93 are connected together to the complementary lead 65 of the trigger control 57. Second inputs of NOR gates 91 and 92 are connected together to the complementary output of the sequence control circuit 68, and second inputs of NOR gates 93 and 94 are connected together to the true output of the sequence control 68. The third inputs of NOR gates 91 to 94 are all connected together to the output of inhibit pulse generator 74. The outputs of the NOR gates 91 to 94 are each coupled through a respective one of pulse amplifiers 95 to 98 and through a respective one of pulse couplers or transformers 99 to 102 to the control gate and cathode of a respective one of the thyristors or silicon-controlled rectifiers 11 to 14.

The operation of the first embodiment of the gating control circuit 30 will be described with reference to FIG. 4. Consider now a point in time $t = t_0$ where the source voltage at the power input terminal 15 crosses the zero voltage level as it changes from negative to positive polarities. At $t=t_o$, the output of zero crossing detector 67 falls to the low-voltage level and an inhibit pulse 200 having a pulse duration $t=t_o$ to $t=t_1$ (see FIGS. 4a to 4c) is generated to disable the NOR gates 91 to 94, while at the same time activates AND gate 75 of the trigger control 73. Transistor 79 is turned on to discharge capacitors 49 and 60 instantaneously. The potential at the noninverting input of operational amplifier 50 falls below the reference potential at its inverting input and the true output 64 of trigger control 57 falls to the low-output level at time $t=t_o$ (FIG. 4h), and at the same time the potential at the inverting input of operational amplifier 45 falls below the potential at the noninverting input to drive it to the high-output state which in turn drives the operational amplifier 46 to the high-output state (FIG. 4f). Therefore, the true and complementary outputs 71 and 72 of sequence control 68 are at the high and low output levels, respectively, at time $t=t_o$ (FIG. 4g). At time $t=t_1$, all the inputs to the NOR gate 91 are simultaneously at the low voltage level to produce a trigger pulse 201 which is supplied to the control gate of thyristor 11 through amplifier 95 and transformer 99 to generate a positive half wave oscillation current 202 (FIG. 4d) that passes through the now conducting thyristor 11 and the commutation circuit 17 and through the capacitor 20 (FIG. 1). Simultaneously, capacitor 60 of the delay circuit 57 is charged to increase the noninverting potential which, upon reaching the inverting potential at time $t=t_2$, drives the operational amplifier 59 to the high output state (FIG. 4h). The input condition of the NOR gate 92 is thus satisfied at time $t=t_2$ to produce a trigger pulse 203 for the thyristor 12, while the trigger pulse 201 for the thyristor 11 terminates.

The commutating capacitor 18 is reversely charged by the current 202. The reverse charge on capacitor 18 turns off thyristor 11 and turns on thyristor 12 at time $t=t_3$ to allow the oscillation current to pass through the now conducting thyristor 12 as a current 204 and through the commutation circuit 17. The reversal of the polarity of the oscillating current at $t=t_3$ is sensed by the detector 43 which generates a pulse 205 in response thereto (FIG. 4e). With the output of detector 43 being at the high voltage level, capacitor 49 of the voltage-controlled timing circuit 44 is charged through resistors 50 and 48 to increase the inverting potential of the operational amplifier 45 which, upon reaching the potential at the noninverting potential, drives the amplifier 45 into the low output state which in turn drives the operational amplifier 46 into the low output state at time $t=t_4$. With the amplifier 46 at the low output state, the output conditions of the sequence control 68 are reversed and as a result the trigger pulse 203 for the thyristor 12 terminates at time $t=t_4$ and the input conditions of the NOR gate 93 are in turn satisfied to produce a trigger pulse 206 for thyristor 13. During the time interval $t=t_3$ to $t=t_4$, the thyristor 12 turns off, and this time interval is set by the voltage-controlled timing circuit 44 which times from the detection of a zero crossing point of the oscillation current.

The lowering of potential at the output of operational amplifier 46 at time $t=t_4$ discharges the capacitor 60 of delay circuit 57 through resistor 58. Upon the noninverting potential of operational amplifier 59 reaching its inverting potential at time $t=t_5$, the true output lead 64 falls to the low voltage level to terminate the trigger pulse 206.

Upon the turn-on of thyristor 13 at time $t=t_4$, the oscillating current is switched from thyristor 12 to the now conducting thyristor 13 and passes through the commutation circuit 17 in the same direction of flow as the flow of current through thyristor 12. Thus, during time interval $t=t_4$ to $t=t_5$, thyristor 12 turns off and an oscillation current 207 commences to flow through the thyristor 13.

The lowering of potential on the output lead 64 at time $t=t_5$ conditions the NOR gate 94 to generate a trigger pulse 208 for the thyristor 14. The oscillating current reverses its polarity at time $t=t_6$ to terminate the pulse 205 at the output of zero crossing detector 43 and charges the commutating capacitor 18 to a level sufficient to turn on thyristor 14 to allow a current flow 209 therethrough.

Upon detection of the zero cross point of the oscillation at time $t=t_6$, the capacitor 49 of the voltage-controlled timing circuit 44 is discharged instantaneously by the zero crossing detector 43 through diode 51 to drive the operational amplifier 45 into the high output state. This allows capacitor 53 to be charged through resistors 55 and 52 to raise the potential at the noninverting input of operational amplifier 46 and upon reaching the inverting potential thereof determined by the power control circuit 31, the output of operational amplifier 46 jumps to the high voltage level at time $t=t_7$. This process will be repeated as long as the source voltage retains its polarity.

When the power setting level is varied by the user, the voltage supplied from the power control circuit 31 through the minimum voltage setting circuit 47 varies accordingly to shift the reference potential for the noninverting and inverting input respectively of the operational amplifiers 45 and 46 to a new setting level. Therefore, the delayed time interval T1 from the zero crossing point of the oscillating current is controlled to raise or lower the oscillation frequency. When the frequency is raised the power withdrawn to the work load will increase. When the magnitude of the load varies, the resonant frequency of the commutation circuit 17 varies correspondingly. Due to the zero crossponding detection of the circuit 43, the voltage-controlled timing circuit 44 can keep track of any oscillation frequency variation which occurs when the load is placed over or removed from the work coil 19 during the operation of the apparatus. Therefore, there is less likelihood of the occurrence of commutation failure caused by change of loads or the generation of radio frequency components caused by interruption of the oscillating current.

For the sake of clarity, FIG. 4d shows only two complete cycles of high frequency oscillation during each half cycle of the source voltage. Actually the oscillation is in the inaudible or ultrasonic frequency range.

The next half wave period of the source voltage begins at time $t=t_0'$, at which the zero crossing detector 67 generates a high voltage output 210 and in response thereto the inhibit pulse generator 74 produces a pulse 211. During the presence of pulse 211, the oscillation is inhibited and at time $t=t_1'$ the trigger control circuit 73 is again brought into action to trigger a sequence of firing operations. At time $t=t_0'$, the AND gate 76 of the trigger control 73 is activated to turn on transistor 85 to instantaneously discharge capacitor 53 of the timing circuit 44 and at the same time charges the capacitor 60 of delay circuit 57 through diode 82. Therefore, the output of timing circuit 44 is at the low voltage level and the true output of delay circuit 57 jumps to the high voltage level at time $t=t_0'$. At time $t=t_1'$, the inhibit pulse 211 terminates and AND gate 76 is deactivated to allow transistor 85 to turn off. Since, at this instant, the output of timing circuit 44 is still in the low voltage level and the output of zero crossing detector 67 is at the high voltage level, the complementary output 72 of sequence control 68 is low. This conditions the NOR gate 92 to generate a trigger pulse 212 for the thyristor 12 so that oscillation current 213 is initiated in the opposite direction to that of the current 202 of the previous half cycle of the source voltage. The current 213 is passed through the commutation circuit 17 and the now conducting thyristor 12 and through the capacitor 20 to reversely charge the commutating capacitor 18. The zero crossing detector 43 generates in response to the sinusoidal half wave pulse 213 an output pulse 214 at time $t=t_1'$ which charges capacitor 49 of the timing circuit 44. On the other hand, the capacitor 60 of delay circuit 57 has been charged up to a level sufficient to drive the operational amplifier 59 to change its output state at time $t=t_2'$. The NOR gate 92 is then conditioned to generate a trigger pulse 215 while the previous trigger pulse 212 is terminated.

The charge on capacitor 49 of the timing circuit 44 has increased to a level sufficient to turn the output state of operational amplifier 45 to the low voltage level, thereby discharging the capacitor 53 instantly, so that the output from the timing circuit 44 remains at the low voltage level until time $t=t_3'$.

At time $t=t_3'$, the reverse charge on the commutating capacitor 18 produces a current 216 which flows through the the now conducting thyristor 11, and the output 214 from zero crossing detector 43 falls to the low voltage level thereby instantly discharging the capacitor 49 through diode 51 to turn the output of operational amplifier 45 to the high output state. The operational amplifier 46 generates an output at time $t=t_4'$ after time interval T1. Sequence control circuit 68 changes its output conditions in response to the change of output state of the timing circuit 44. Thus, at time $t=t_4'$, the input conditions of the NOR gate 94 are satisfied to generate a trigger pulse 217 for firing thyristor 14 to generate current 218. At time $t=t_5'$, the delay circuit 57 changes its output conditions which satisfy the input conditions of the NOR gate 93 to generate a trigger pulse 219, while terminating the previous trigger pulse 217. This process will be repeated as long as the source voltage retains its polarity.

The minimum voltage setting circuit 47 includes a transistor 47a having its collector-emitter path connected between the voltage supply Vcc and the output of power control circuit 31 and its base connected to a junction between resistors 47b and 47c series-connected between the voltage supply Vcc and ground. When the voltage at the emitter of transistor 47a decreases to a level lower than the potential at the junction between the resistors 47b and 47c, the transistor 47a continues to conduct current through its collector emitter path so that the potential supplied to the voltage-controlled timing circuit 44 is thereafter maintained constant to ensure a minimum time interval so that a thyristor of the previously conducting bidirectional device is allowed to turn off during that interval before a thyristor of the subsequently conducting bidirectional device is fired. For example, if thyristor 11 should fail to turn off during the time interval from $t=t_3$ to $t=t_4$, thyristors 11 and 13 will be simultaneously conducted to provide a short circuit path between the input power terminals 15 and 16 and as a result commutation failure occurs. Likewise, should simultaneous conduction of thyristors 12 and 14 occur at time $t=t_4'$, commutation failure will also occur.

FIG. 5 illustrates a modification of the circuit of FIG. 3. Identical numbers are used to indicate identical parts to those shown in FIG. 3. In FIG. 5, thyristors 11 and 12 in the first bidirectional switching device are simultaneously fed with trigger pulses to trigger one of the thyristors 11 and 12 depending on the polarity of the source voltage, and thyristors 13 and 14 in the second bidirectional switching pair are also simultaneously fed with trigger pulses to trigger one of the thyristors 13 and 14 depending on the polarity of the source voltage. In order to simultaneously supply the trigger pulses to the thyristors 11 and 12 or 13 and 14, the outputs of the sequence control circuit 68 are coupled through inhibit gates 231 and 232 to pulse amplifiers 234 and 235, respectively.

Figure 7:
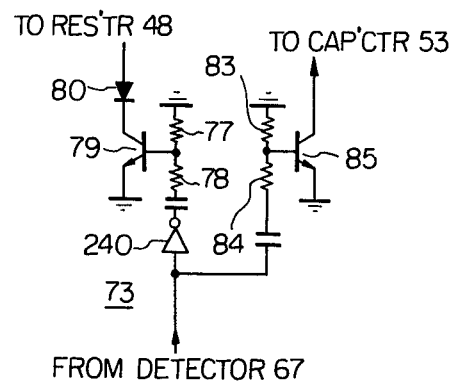
FIG. 7 is a circuit diagram of a trigger control circuit of FIG. 5.

Since the thyristor cannot fire even if a gating pulse is applied thereto until the voltage appearing across its anode and cathode terminals reaches a sufficient level to cause firing, the trigger pulses used in the circuit of FIG. 5 have a sufficient duration in which the source voltage is allowed to reach the firing level of one of the thyristors 11 and 12 depending on the polarity of the source voltage at the beginning of each half cycle of the source voltage. Therefore, the inhibit pulse generator 74 of the circuit of FIG. 3 is dispensed with. In FIG. 5, the inputs to the pulse couplers 99 and 100 are connected together to the output of pulse amplifier 234 and the inputs to the pulse couplers 101 and 102 are connected together to the output of pulse amplifier 235. To prevent simultaneous conduction of both bidirectional switching devices in the same direction of conduction, an inhibit pulse generator 230 is provided having one input connected to the output of zero crossing detector 43 and a second input connected to the output of the firing angle control circuit 44. The output of the inhibit pulse generator 230 is connected to the control gates of the inhibit gates 231 and 232. The inhibit pulse generator 230, as shown in FIG. 6, comprises a monostable multivibrator 236 having its input connected to the output of zero crossing detector 43 and its output connected to a first input of a NAND gate 237 and to an inverted input of an AND gate 238. The gates 237 and 238 have their second inputs connected together to the output of voltage-controlled timing circuit 44 and their outputs connected to the control electrodes of the inhibit gate 231 and 232 through an OR gate 239. In the circuit of FIG. 5 the trigger control circuit 73 dispenses with the AND gates 75 and 76 and diodes 81 and 82 used in the circuit of FIG. 3 as shown in FIG. 7 so that the output from the zero crossing detector 67 is directly applied to the voltage dividing resistors 84 and 83 on the one hand, and on the other hand coupled through a NOT circuit 240 to the voltage dividing resistors 77 and 78 and the circuit connecting the capacitor 60 of the circuit of FIG. 3 to the trigger control circuit 73 is also deleted.

Figure 8:
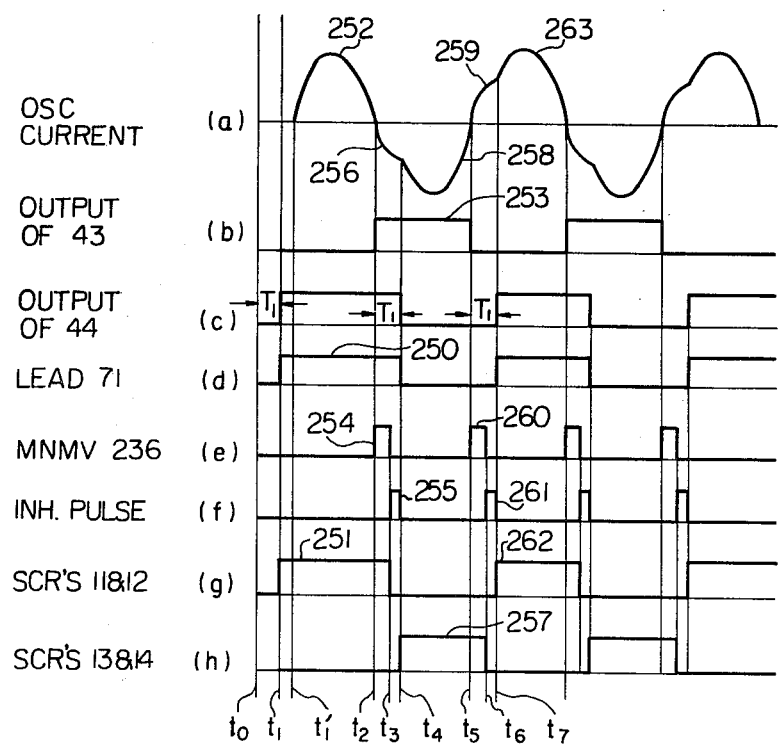
FIG. 8 is a series of waveforms appearing at various points of the circuit of FIG. 5.

The operation of the circuit of FIGS. 5 to 7 will be described with reference to the waveforms illustrated in FIG. 8. It is assumed that at time $t=t_o$, the source voltage at terminal 15 is at zero and its subsequent half cycle is positive with respect to terminal 16. The source voltage zero crossing detector 67 produces a low voltage output which turns on transistor 79 to discharge capacitor 49 of the timing circuit 44 so that operational amplifier 46 generates a high voltage output at time $t=t_1$ after the time interval T1 (FIG. 8c). The sequence control 68 responds by generating a high voltage pulse 250 (FIG. 8d) on its true output lead 71 which is passed through inhibit gate 231 to the pulse amplifier 234 so that trigger pulse 251 is simultaneously applied to thyristors 11 and 12 (FIG. 8g). Since the terminal 15 is positive respect to terminal 16, thyristor 11 is forwardly biased to conduct current 252 when the source voltage reaches the firing potential level at time $t=t_1$, while thyristor 12 is backwardly biased to remain off. Oscillation is thus triggered in the commutation circuit 17 through the low conducting thyristor 11. Upon reversal of the oscillation current polarity at time $t=t_2$, the zero crossing detector 43 generates a high voltage output 253 which causes the monostable multivibrator 236 of the inhibit pulse generator 230 to generate a pulse 254 having a duration $t=t_2$ to $t=t_3$, and at the same time charges the capacitor 49 of timing circuit 44 to drive operational amplifier 45 to the low output state upon reaching the potential at the noninverting input thereof. As previously described, the capacitor 53 will be discharged instantly through diode 56 so that operational amplifier 46 will switch to the low output state at time $t=t_4$. During the time interval $t=t_3$ to $t=t_4$, the AND gate 238 is conditioned to produce an output pulse 255 which is passed through OR gate 239 to the inhibit gates 231 and 232 so that the trigger pulse 251 terminates at time $t=t_3$. Thus, at time $t=t_2$, the thyristor 12 is turned on to conduct current 256 which is present until time $t=t_4$ when the timing circuit 44 reverses its output conditions and the complementary output 72 of the sequence control circuit 68 goes high and produces a trigger pulse 257 for simultaneous application through pulse couplers 101 and 102 to the control gates of thyristors 13 and 14. Thyristor 13 is biased forwardly into conduction at time $t=t_4$ to pass current 258, while thyristor 14 remains off until the oscillation reverses its polarity at time $t=t_5$. At time $t=t_5$, thyristor 14 is turned on to conduct current 259, while thyristor 13 is turned off, and zero crossing detector 43 delivers a low voltage output to instantly discharge capacitor 49 of the timing circuit 44 to allow capacitor 53 to be charged and cause monostable multivibrator 236 to generate an output 260 having a duration $t=t_5$ to $t=t_6$. At time $t=t_7$, the voltage across the capacitor 53 reaches a level sufficient to drive operational amplifier 46 into the high output state. Therefore, during the time interval $t=t_6$ to $t=t_7$ the NAND gate 237 of the inhibit pulse generator 230 is conditioned to produce an output pulse 261 (FIG. 8f) which terminates the trigger pulse 257 at time $t=t_6$. The high voltage output from the voltage controlled timing circuit 44 at time $t=t_7$ reverses the output states of the sequence control circuit 68 and a trigger pulse 262 is generated for simultaneous application to thyristors 11 and 12. Thyristor 11 will be turned on at time $t=t_7$ to pass current 263. This process will be repeated as long as the source voltage retains its polarity.

When the source voltage reverses its polarity, trigger control circuit 73 discharges the capacitor 53 of voltage-controlled timing circuit 44 to provide a low voltage output to the sequence circuit 68. Since the source voltage zero crossing detector 76 produces a high output voltage, the true output 71 of sequence control circuit 68 delivers a trigger pulse for simultaneous application to thyristors 11 and 12. Thyristor 12 will be fired in the first place rather than thyristor 11. Similar circuit actions to those described in connection with the previous half cycle of the source voltage will take place as long as the source voltage retains its polarity. Since the presence of the trigger pulse applied to the previously fired thyristor at the time of application of the next trigger pulse to the subsequently fired thyristor would provide a short circuit condition across the input terminals 15 and 16, thereby causing a commutation failure, the inhibit pulse generated by the circuit 230 thus prevents possibility of such simultaneous presence of the trigger pulses.

Figure 9:
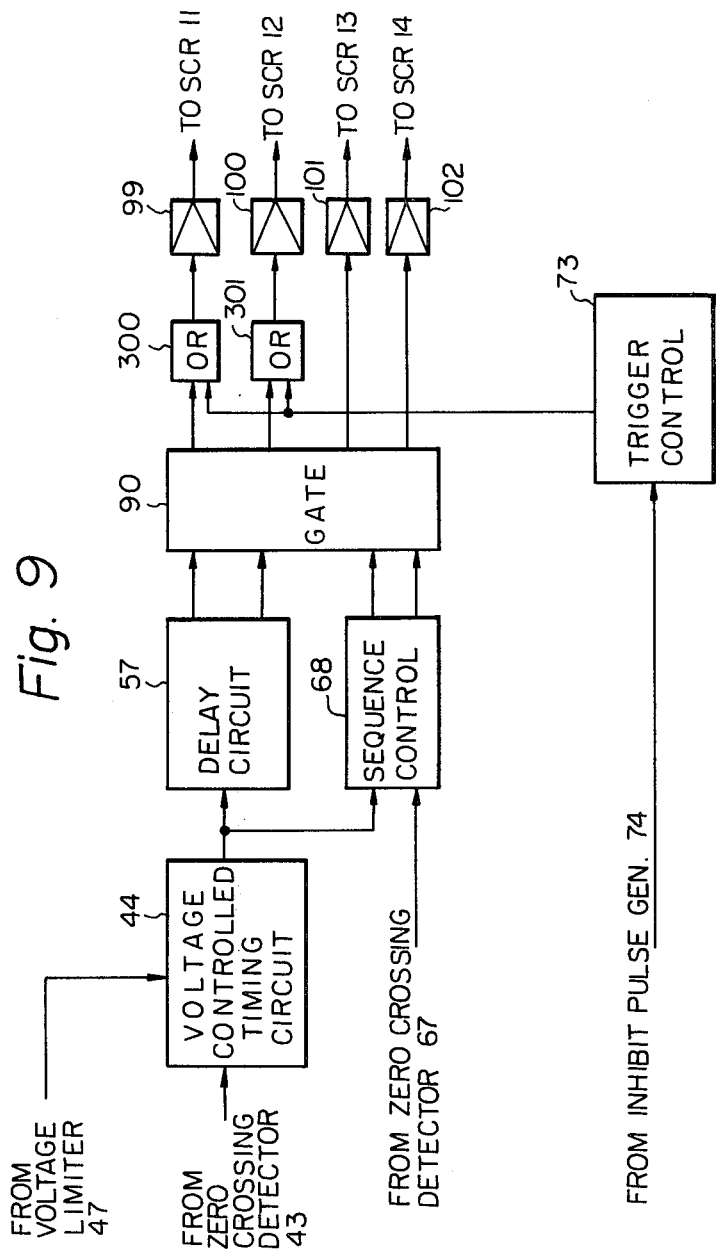
FIG. 9 is a second modification of the gating control circuit of FIG. 3.

A further modification of the circuit of FIG. 3 is shown in FIG. 9 in which identical parts to those shown in FIG. 3 are indicated by identical numbers used in FIG. 3. The circuit of FIG. 9 is generally similar to the circuit of FIG. 3 except that the output of trigger control circuit 73 is connected to the pulse amplifiers 99 and 100 through a respective one of OR gates 300 and 301 through which the trigger pulses for the thyristors 11 and 12 are also connected respectively to the pulse amplifiers 99 and 100.

The trigger control circuit 73 may comprise a monostable multivibrator or a differentiating circuit that produces an output in response to the trailing edge of the input pulse. Since the inhibit pulse generator 74 generates an output in response to the detected zero crossing point of the source voltage, the trigger control 73 generates a trigger pulse when the source voltage reaches the firing level of the thyristor 11 or 12. The pulse from the trigger control 73 is simultaneously applied to the thyristors 11 and 12 and either one of which will be fired depending on the polarity of the source voltage. Once either thyristor 11 or 12 is fired, oscillation occurs and its reversal of polarity is sensed by the zero crossing detector 43 and fed back to the voltage controlled timing circuit 44 to determine the subsequent firing angle of the thyristor 13 or 14 in a manner identical to the circuit of FIG. 3.

Figure 10:
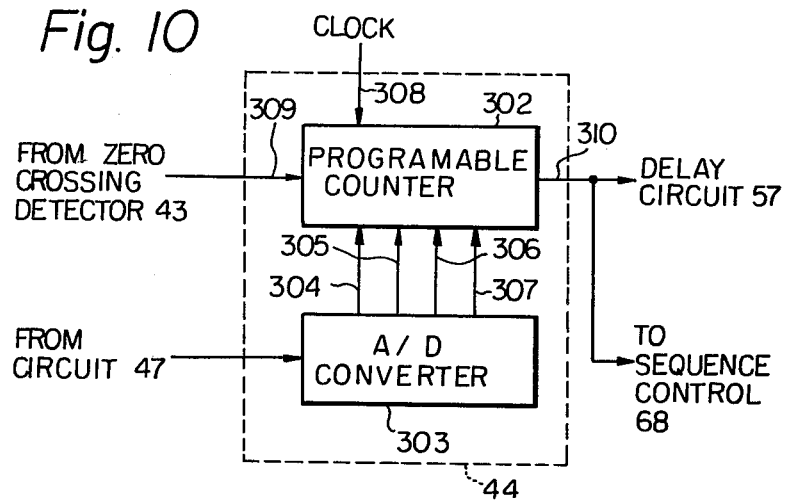
FIG. 10 is a third modification of the gating control circuit of FIG. 3 in which a programable counter is employed.

The voltage-controlled timing circuit 44 used in the circuit of FIG. 9 can be replaced with a digital circuit comprised by a programable counter 302 and an analog-to-digital converter 303, as illustrated in FIG. 10. The output from the power control circuit 31 through the minimum voltage setting circuit 47 is coupled to the A/D converter 303 to convert the analog input value into a digital code represented by binary digits on a plurality of output leads 304 to 307 (only four leads are shown for simplicity) which are coupled to the corresponding input leads of the programable counter 302. The counter 302 receives clock pulses on its lead 308 and an input signal from the zero crossing detector 43 on its lead 309 and generates an output on lead 310. The programable counter 302 starts counting the clock pulses and, upon reaching a predetermined count set by the digital code received from the A/D converter 303, produces an output on lead 310. This output persists as long as the duration of the input signal from the zero crossing detector 43.

Figure 11:
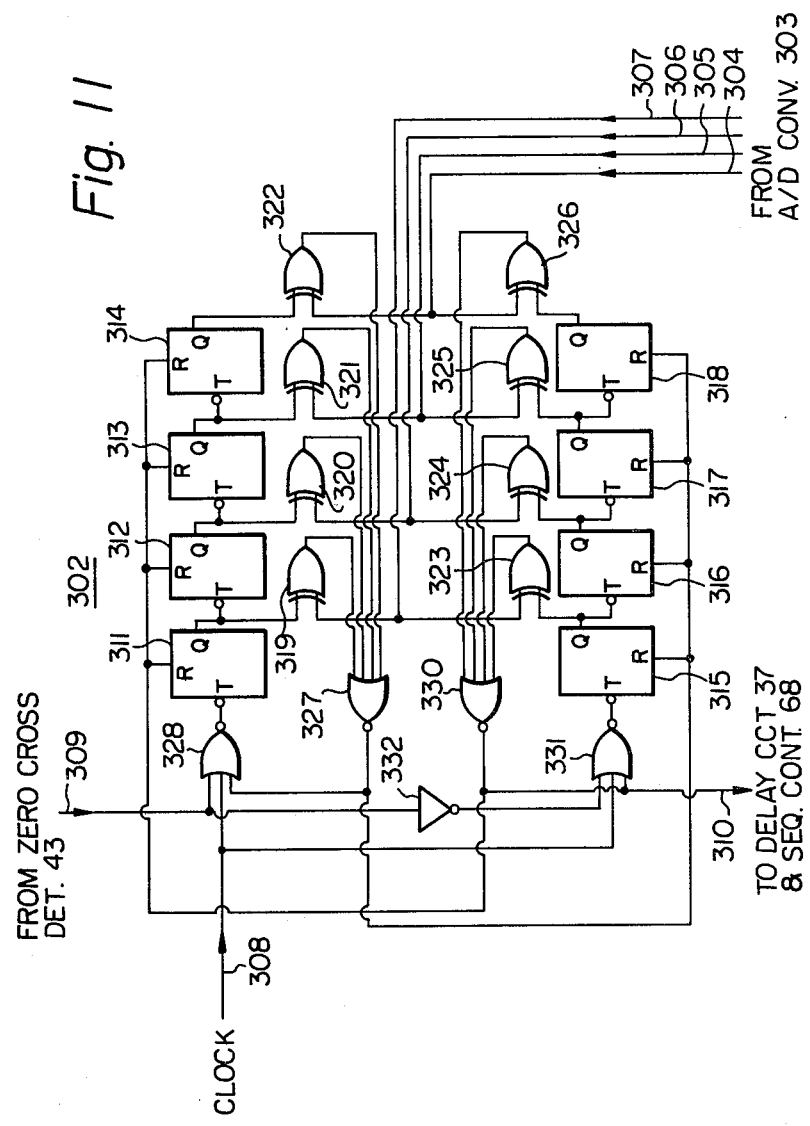
FIG. 11 is a detailed circuit of the programable counter of FIG. 10.

FIG. 11 illustrates an example of the programable counter 302 which includes a first set of four flip-flops 311, 312, 313 and 314 and a second set of four flip-flops 315, 316, 317 and 318. The Q output of flip-flops 311 to 314 is connected to the trigger input of the next flip-flop except for the flip-flop 314 and also to a first input of each one of Exclusive-OR gates 319, 320, 321 and 322. Similarly, the Q output of flip-flops 315 to 318 is connected to the trigger input of the next flip-flop except for the flip-flop 318 and also to a first input of each one of Exclusive-OR gate 323, 324 325 and 326. The second inputs of flip-flops 319 and 323 are connected together to the lead 304. Similarly, the second inputs of Exclusive-OR gates 320 to 322 are connected to the second inputs of a corresponding one of Exclusive-OR gates 324 to 326 and to the input leads 305, 306 and 307, respectively. The outputs of Exclusive-OR gates 319 to 322 are connected to a NOR gate 327 whose output is connected to a first input of a NOR gate 328 with its output being connected to the trigger input of flip-flop 311. The output of NOR gate 327 is further connected to the reset terminals of flip-flops 315 to 318. Similarly, the outputs of Exclusive-OR gates 323 to 326 are connected to a NOR gate 330 whose output is connected to a first input of a NOR gate 331 to the output lead 310 and also connected to the reset terminals of flip-flops 311 to 314. The output of NOR gate 331 is connected to the trigger input of flip-flop 315. Second inputs of NOR gates 328 and 331 are connected together to the clock input lead 308. The input signal from zero crossing detector 43 over lead 309 is connected to the third input of NOR gate 328 and through a NOT circuit 332 to the third input of NOR gate 331.

In operation, a high voltage output from zero crossing detector 43 is inverted by NOT circuit 332 to enable NOR gate 331 to pass clock pulses to the trigger input of flip-flop 315. Flip-flops 315 to 318 changes their binary states in response to the input clock pulse. When the Q outputs of flip-flops 315 to 318 coincide with the binary digits on input leads 304 to 307, all Exclusive-OR gates 315 to 318 switch to the low output state which turns on NOR gate 330 to disable NOR gate 331 to prevent further counting of input clock pulses while resetting flip-flops 311 to 314 to enable NOR gate 328 to accept clock pulses when the input on lead 309 falls to zero. The output lead 310 is thus brought to a high voltage potential at a time delayed from the instant of application of the input signal on lead 309. When the input signal on lead 309 falls to zero, NOR gate 328 is enabled to pass clock pulses to the trigger input of flip-flop 311 to change the binary states of flip-flops 311 to 314 in a manner as described above. When coincidence occurs between the binary outputs of flip-flops 311 to 314 with the binary digits on lead 304 to 307, NOR gate 327 produces a logic "1" output to disable the NOR gate 328, while at the same time resets flip-flops 315 to 318 so that the high voltage output on lead 310 terminates at a time delayed from the end of the high voltage input on lead 309. Therefore, the delayed intervals at the beginning and end of the high voltage output from lead 310 are determined by the binary digits received from the A/D converter 303.

Figure 12:
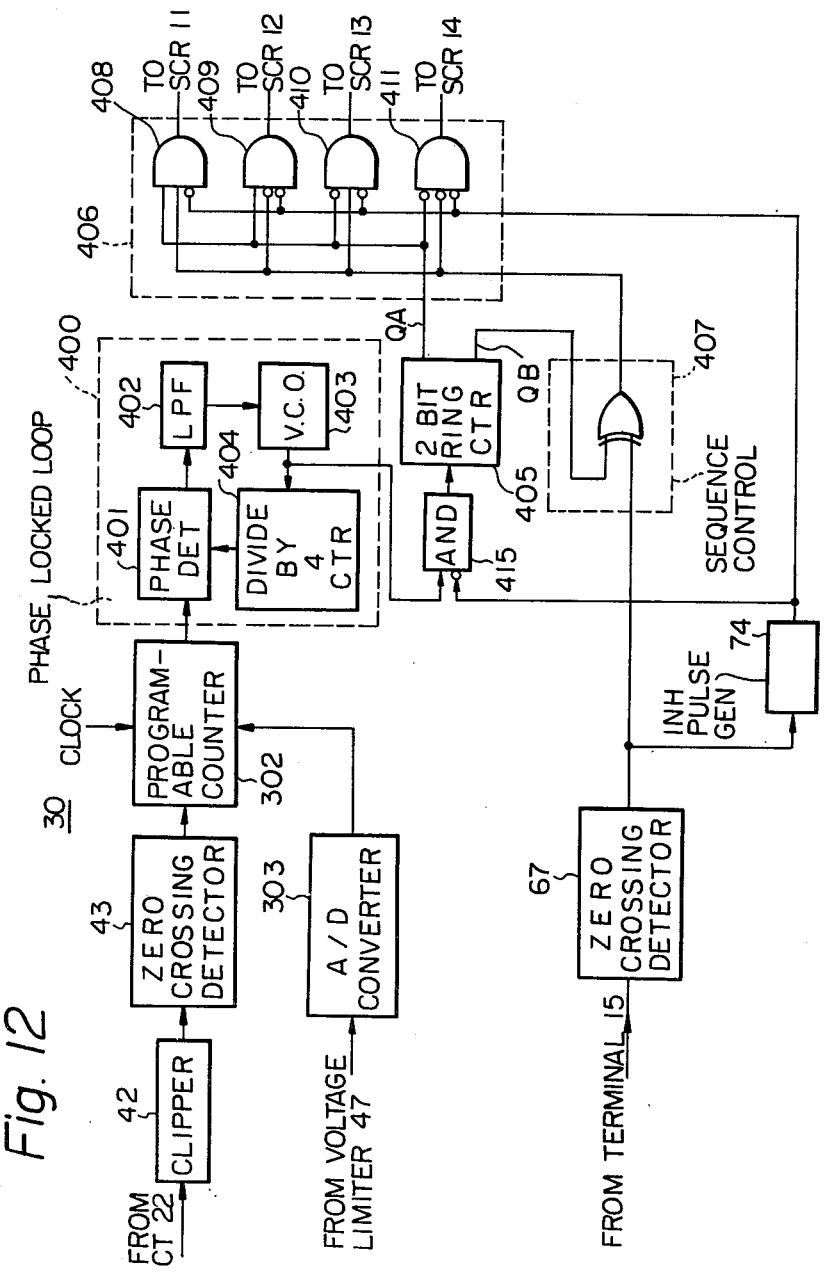
FIG. 12 is a fourth modification of the gating control circuit of FIG. 3 in which a phse-controlled loop is employed in combination with the programable counter.

FIG. 12 shows a further modification of the embodiment of FIG. 3. The parts identified by the same numerals as used in the preceding figures have the same function as those used in the circuits of the preceding figures. The gating circuit 30 of FIG. 12 includes the programable counter 302 and A/D converter 303 employed in the circuit of FIG. 10 and a phase-locked loop 400 which includes a phase detector 401, a lowpass filter 402, a voltage-controlled oscillator 403 and a divide-by-4 counter 404. The output from the programable counter 302 is connected to a first input of the phase detector 401 whose output is connected through the lowpass filter 402 to the frequency control terminal of the voltage-controlled oscillator 403. The frequency of the oscillator 403 is counted down by the counter 404 and applied to a second input of the phase detector 401. The output from the oscillator 403 is also connected to a 2-bit ring counter 405 through an AND gate 415 which is enabled by the output from inhibit pulse generator 74. The ring counter 405 has its first output connected to gate circuit 406 and its second output connected to a first input of a sequence control circuit or Exclusive-OR gate 407. The output from the zero crossing detector 67 is connected to a second input of the Exclusive-OR gate 407. The logic gate circuit 406 includes four AND gates 408, 409, 410 and 411. The AND gates 408 to 411 have their first inputs connected together to the first output of the ring counter 405, their second inputs connected together to the output of Exclusive-OR gate 407 and their third inputs connected together to the output of inhibit pulse generator 74. The output from each AND gate is connected through pulse amplifier and coupler to the control gate and cathode terminal of the corresponding thyristor in a manner as described previously.

Figure 13:
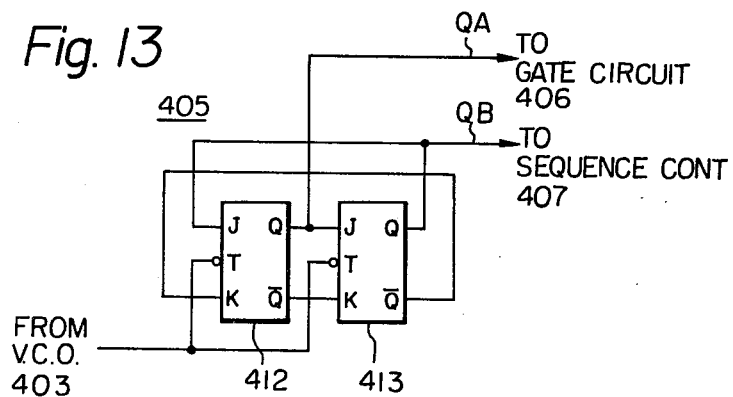
FIG. 13 is an example of a 2-bit counter of FIG. 12.

An example of the 2-bit ring counter 405 is illustrated in FIG. 13 as comprising a first J-K flip-flop 412 and a second J-K flip-flop 413 having their trigger inputs connected together to the output of voltage-controlled oscillator 403. The J input of flip-flop 412 is connected to the complementary output $\overline{Q}$ of second flip-flop 413 whose true output Q is connected to the first input of sequence control circuit and also to the K input of flip-flop 412. The first flip-flop 412 has its true and complementary outputs connected to the J and K inputs of the second flip-flop 413, respectively. The Q output of flip-flop 412 is also connected to the second inputs of AND gates 408.

In operation, the voltage-controlled oscillator 403, when energized, provides its output to the trigger inputs of flip-flops 412 and 413 of the 2-bit ring counter 405. In response to the trailing edge of a first input pulse, the first flip-flop 412 turns on to provide a logic "1" on its true output (see FIG. 14). The second flip-flop 413 turns on in response to the trailing edge of a second input pulse to provide a logic "1" on its true output which is also provided to the K input of flip-flop 412. In response to the trailing edge of a third input pulse, the first flip-flop 412 turns off to place a "0" on its true output. The second flip-flop 413 will turn off at the trailing edge of a fourth input pulse. During the interval from the first to fourth input pulses, there is a set of four different binary states on the true outputs of flip-flops 412 and 413.

Figure 14:
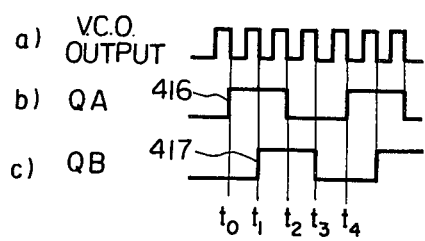
FIG. 14 is a timing diagram useful for explanation of the operation of ring counter of FIG. 13.

As soon as the gate circuit 406 is enabled in a manner as described above, AND gate 415 is also enabled to pass a first input signal from the output of voltage-controlled oscillator 403 which in response thereto generates an output pulse 416 on output lead QA which persists during the interval $t_0$ to $t_2$ (see FIG. 14). During this interval, the flip-flop 413 is in the low output state. Assuming that the source voltage at the input terminal 15 is positive with respect to terminal 16, a low voltage output will be delivered from the zero crossing detector 67 to the second input of Exclusive-OR gate 407 so that its output goes high during the time interval $t_0$ to $t_1$. This conditions the AND gate 408 to generate a trigger pulse that turns on thyristor 11. In the time interval $t=t_1$ to $t=t_2$, the high voltage output on lead QB causes the Exclusive-OR gate 407 to generate a low voltage output and activates AND gate 409 which in turn triggers thyristor 12, while deactivates AND gate 408. During the time interval $t=t_2$ to $t=t_3$, AND gate 410 is activated to trigger thyristor 13, and in the interval $t=t_3$ to $t=t_4$ thyristor 14 will be triggered into conduction. Oscillation is generated in the commutation circuit 17 and detected by the zero crossing detector 43 in a manner as described previously. The output from the zero crossing detector 43 is delayed by the programable counter 302 and applied to the phase detector 401 for comparison in phase with the output from the divide-by-four counter 404. Since an output from the programable counter 302 occurs for each complete cycle of oscillation, the output from the divider 404 has the same frequency as the repetition frequency of the programable counter 302. The output from the phase detector 401 represents the difference between the thyristor trigger timing and the delayed zero crossing point. The high frequency components contained in the output from the phase detector 401 are filtered through the lowpass filter 402 and the oscillator 403 is controlled in phase by the output from the phase detector 401 such that the output from the divider 404 comes into exactly in phase with the output from the programable counter 302. Therefore, the oscillation current is triggered in phase with the output from the programable counter 302, and hence in phase with the controlled delay timing from the zero crossing point of the oscillation.

Figure 15:
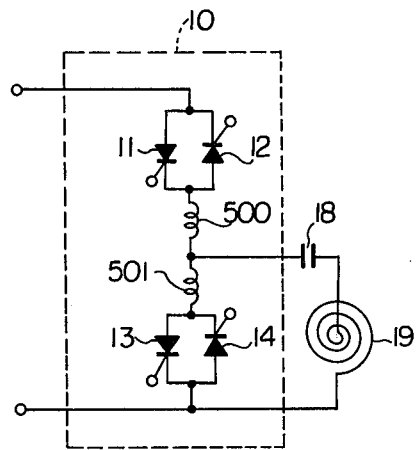
FIG. 15 is a modification of a cycloconverter of FIG. 1.

FIG. 15 shows a modification of the cycloconverter 10 of FIG. 1. The cycloconverter 10 of FIG. 15 includes additionally inductors 500 and 501 connected in series between the first bidirectional switching device comprised by thyristors 11 and 12 and the second bidirectional switching device comprised by thyristors 13 and 14. The junction between the inductors 500 and 501 is connected to the commutating capacitor 18. The effect of the inductor 501 is to improve the di/dt capability of thyristors 13 and 14 by causing the oscillation current flow therethrough to increase slowly in order to retard the triggering instant thereof. Similarly, the effect of inductor 500 is to improve the di/dt capability of thyristors 11 and 12 by causing the oscillation current flow therethrough to increase slowly to retard the triggering instant thereof. This effectively prevents the possibility of the simultaneously firing of thyristors 11 and 13 or thyristors 12 and 14 as the oscillation current is switched from one bidirectional switching device to the other, thereby avoiding commutation failures. This arrangement is particularly advantageous to the embodiment of FIG. 5 in that the inhibit pulse generator 230, inhibit gates 231 and 232 achieve the same function as the inductors 500 and 501.

Figure 16:
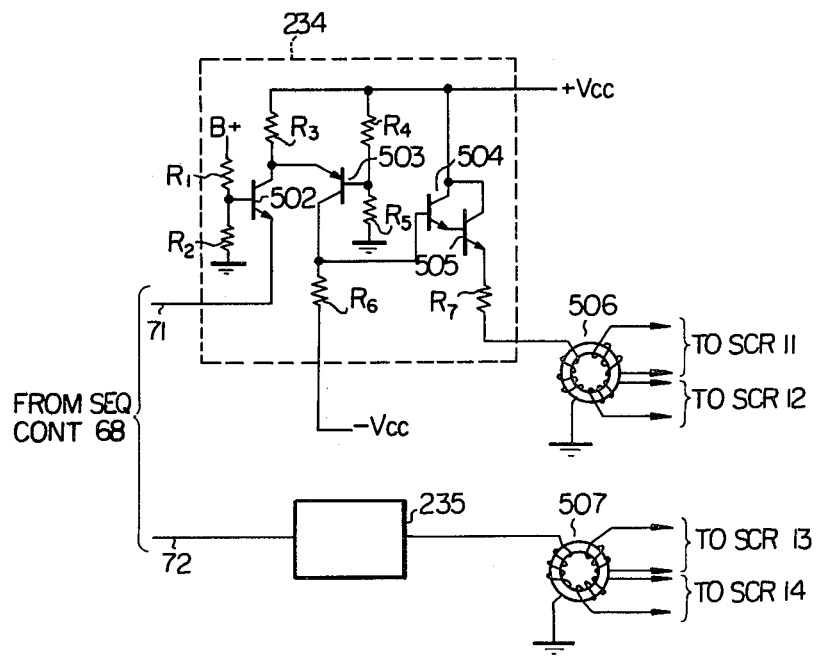
FIG. 16 is a circuit diagram of a pulse amplifier to be used in the circuits of the preceding figures for generating a negative bias potential to turn off the switching circuit.

FIG. 16 illustrates another approach to the problem of simultaneous firing of the two bidirectional switching devices, which is advantageously employed in the circuit of FIG. 5 since the inhibit pulse generator 230 and inhibit gates 231 and 232 can also be dispensed with. In FIG. 16 the pulse amplifier 234 of FIG. 5 is shown as comprising a transistor 502 having its base connected to a DC voltage source B+ through a voltage divider R1 and R2 and its collector connected through a load impedance R3 to a positive voltage supply +Vcc and also to the emitter of a transistor 503 whose base is connected to a resistor voltage divider R4 and R5 series connected between the voltage supply Vcc and ground. The collector of transistor 503 is connected to the base of a Darlington amplifier formed by transistors 504 and 505 and also to a negative voltage supply −Vcc through resistor R6. The emitter of output transistor 505 is connected through resistor R7 and through the primary winding of a transformer 506 to ground. The emitter of input transistor 502 is connected directly to the output lead 71 of sequence control circuit 68. The pulse amplifier 235 of the embodiment of FIG. 5 has a similar circuit configuration to the pulse amplifier 234 with its input terminal connected directly to the output lead 72 of sequence control circuit 68 and its output terminal connected through the primary winding of a transformer 507 to ground. On the same core of the transformer 506 is coiled a pair of secondary windings to simultaneously supply trigger pulses to thyristors 11 and 12. Similarly, a pair of secondary windings is coiled around the core of transformer 507 to simultaneously supply trigger pulses to thyristors 13 and 14.

When the output from the sequence control circuit 68 on lead 71 goes high to trigger thyristors 11 and 12, transistor 502 will turn off to supply the supply voltage Vcc to the emitter of transistor 503 to turn it on. The turn-on of transistor 503 couples a positive bias potential to the base of transistor 504. The Darlington amplifier transistors 504 and 505 are turned on to supply current to the primary winding of the transformer 506. When the output from the sequence control circuit 68 goes low, the transistor 502 will turn on and transistor 503 turn off. The turn-off of transistor 503 couples the negative potential −Vcc to the base of transistor 504 to turn off the Darlington amplifier transistors. The current flow through the primary winding instantly decreases to zero ampere and as a result of the abrupt change in flux in the primary winding the voltage thereacross sharply drops to the negative potential −Vcc and thereafter increases exponentially toward the zero voltage level, and the gate electrodes of thyristors 11 and 12 are reversely biased with respect to their cathode terminals. The reverse bias on the control gate of thyristors 11 and 12 effectively drives off the carriers present between their semiconductor junctions to turn them off and therefore avoids the possibility of the thyristor 11 being fired again at the instant the thyristor 13 is triggered at time $t=t_5$ (FIG. 8). Similar circuit actions will take place when the pulse amplifier 235 is subsequently activated by a trigger pulse on lead 72 to trigger thyristors 13 and 14, and the reverse bias on their control gates drives off the carriers present between their semiconductor junctions to avoid the possibility of the thyristor 13 being fired again at the instant the thyristor 11 is triggered at time $t=t_7$.

The foregoing description shows only preferred embodiments of the present invention. Various other modifications are apparent to those skilled in the art without departing from the scope of the present invention which is only limited by the appended claims. Therefore, the embodiments shown and described are only illustrative, not restrictive.

What is claimed is:

1. An induction heating cooking apparatus including a solid state switching device connected to receive power from a source of low frequency energy, a load circuit and a control circuit for triggering said switching device to generate energy of high frequency oscillations in said load circuit to produce heat in an inductive cooking ware by electromagnetic induction, said control circuit comprising:
   a zero crossing detector for detecting a zero crossover point of said high frequency oscillations;
   means for detecting the magnitude of the high frequency energy delivered to said inductive cooking ware;
   means for establishing a setting level representing a desired energy level;

comparator means for detecting the deviation of the magnitude of the detected high frequency energy from said setting level;

a source of clock pulses;

a programmable counter for counting said clock pulses in response to the detection of each zero crossover point of said high frequency oscillations for the period of time proportional to said detected deviation of high frequency energy; and a phase-locked loop including a voltage-controlled oscillator and a phase detector receptive of the outputs of said oscillator and said programmable counter to generate a phase difference signal which is coupled to said oscillator to control the frequency thereof to reduce the difference in phase between said outputs of said counter and oscillator to zero, said switching device being responsive to the output of said voltage-controlled oscillator to generate said high frequency oscillation.

2. An induction heating cooking apparatus as claimed in claim 1, further comprising a second solid state switching device which is coupled to the first-mentioned switching device in an inverse parallel circuit and a ring counter connected to the output of said voltage-controlled oscillator, the output of said ring counter being connected to the control gates of said first and second switching devices.

3. An induction heating cooking apparatus as claimed in claim 1, further comprising a second zero crossing detector for detecting a zero crossover point of said low frequency energy source and means for inhibiting the output of said voltage-controlled oscillator in response to the detection of each zero crossover point of said low frequency energy.

4. An induction heating cooking apparatus as claimed in claim 1, further comprising an analog-to-digital converter for converting said detected deviation of high frequency energy into digital signals, and wherein said programmable counter comprises:

a first group of bistable devices each having a trigger input connected to the output of another bistable device such that an input signal applied to one of the bistable devices changes the binary state of said another bistable device;

a first group of Exclusive-OR gate equal in number to said bistable devices, each of said Exclusive-OR gate having first and second inputs, the first input being connected to the output of a corresponding one of the bistable devices and the output of each Exclusive-OR gate being connected to an input of a first NOR gate;

a second group of bistable devices equal in number to said bistable devices of the first group, each of said bistable devices of the second group having a trigger input connected to the output of another bistable device of the second group such that an input signal applied to one of the bistable devices of the second group changes the binary state of said last-mentioned another bistable device;

a second group of Exclusive-OR gates equal in number to said bistable devices of the first group, each of said Exclusive-OR gates of the second group having first and second inputs, the first input being connected to the output of a corresponding one of the bistable devices of the second group and the output from each Exclusive-OR gate of the second group being connected to an input of a second NOR gate;

the second input of each Exclusive-OR gate of the first group and the second input of a corresponding one of the Exclusive-OR gates of the second group are connected together to receive said digital signal from said analog-to-digital converter, the output from said first NOR gate being connected to reset all of said bistable devices of the second group, and the output from said second NOR gate being connected to reset all of said bistable devices of the first group;

a first gate for passing said clock pulses to the trigger input of one of said bistable devices of the first group and connected to the output of said zero crossing detector to be enabled in response thereto and to the output of said first NOR gate to be disabled in response thereto;

a second gate for passing said clock pulses to the trigger input of one of said bistable devices of the second group and connected to the output of said zero crossing detector through a third NOR gate to be enabled in response thereto and to the output of said second NOR gate to be disabled in response thereto, the output of said second NOR gate being the output of said programmable counter.

5. An induction heating cooking apparatus as claimed in claim 1, further comprising means for limiting the magnitude of said detected high frequency energy to a predetermined value corresponding to the turn-off time of said switching device.

* * * * *